X. HELMBACHER.
TOOTH FOR CULTIVATORS, HARROWS, AND THE LIKE.
APPLICATION FILED JUNE 1, 1912.
1,042,674.
Patented Oct. 29, 1912.
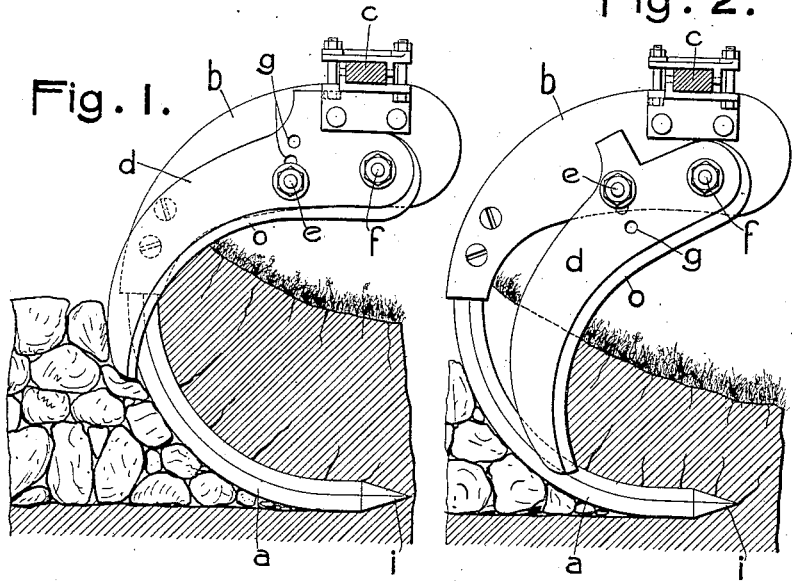
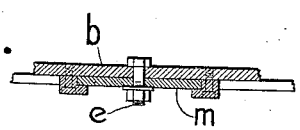
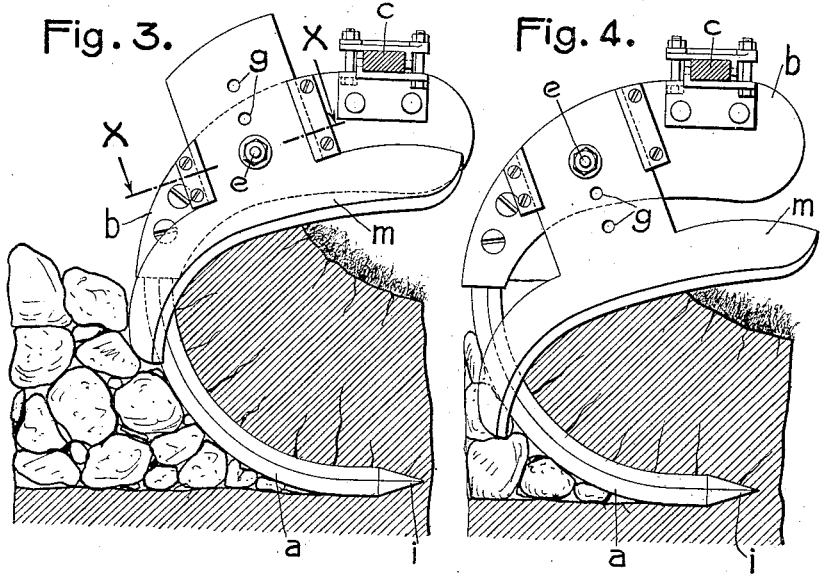
WITNESSES
INVENTOR
XAVER HELMBACHER
BY
ATTORNEY

UNITED STATES PATENT OFFICE.

XAVER HELMBACHER, OF FELDBACH, NEAR WALDIGHOFEN, GERMANY.

TOOTH FOR CULTIVATORS, HARROWS, AND THE LIKE.

1,042,674.  Specification of Letters Patent.  Patented Oct. 29, 1912.

Application filed June 1, 1912. Serial No. 700,987.

*To all whom it may concern:*

Be it known that I, XAVER HELMBACHER, a subject of the Emperor of Germany, and resident of Feldbach, near Waldighofen, Alsatia, Germany, have invented new and useful Improvements in Teeth for Cultivators, Harrows, and the Like, of which the following is a full, clear, and exact specification.

In recent times various constructions of teeth for cultivators have been produced for the purpose of a better and easier cultivation of the ground, as for instance spring teeth with cutting angle adjustment, spring-supported rigid teeth, which keep uniform the acute cutting angle and have their points lying parallel to the surface of the earth, in which constructions the teeth are so formed that they form either an arc open above, or an arc closed above, so that in the latter case they can hold down large clods and masses of weed which they have seized and prevent choking upward. But in these constructions especially in the case of heavy, wet, weedy soil large clods are torn away anyhow, with great expenditure of power, so that such clods are dragged along some distance and cause stoppages. In order to overcome these drawbacks, *i. e.* to attain a certain regular and easy pulverizing of the soil to be worked, with intensive cultivation thereof, according to the present invention, yielding polygonal teeth of agricultural implements such as cultivators, harrows and the like, having their points lying parallel to the surface of the ground, are attached to supports adapted to the form of the corresponding tooth and carrying each a blade adjustable in the vertical direction with its cutting edge turned backward and downward so that the portion of ground detached by the points of the polygonal teeth parallel to the surface of the ground is forced in between the cutting blade and the polygonal tooth as in a shears, and is cut up together with the weeds, roots and clods. In consequence of the adjustability of the blade connected to each tooth it becomes possible to attain a cutting up of the raised earth by means of the blade effectively at any desired depth of cultivation of the teeth. In contra-distinction to the action of a colter which works forward and from underneath upward in the solid ground, the cutting blade according to the present invention operates from above downward and backward only upon the already detached earth layer while the same is raised and resting upon the tooth and against the action of this latter. The teeth can in the present invention be formed curved preferably to the extent of a quarter-circle or be adjusted in a sloping straight line.

In the drawing are illustrated two constructions of the invention. Figures 1 and 2 show the first construction in two different positions of the blade. Figs. 3 and 4 are similar illustrations of the second construction, and Fig. 5 shows a section on the lines $x$—$x$ Fig. 3.

In both constructions the quadrangular tooth $a$ curved in the form of a quarter-circle with its points lying parallel to the surface of the ground is held by a support $b$, which is fixed in any convenient manner to a cross piece $c$ of the frame, and forms with the tooth $a$ approximately a semi-circle. To this support $a$, the knife blade $d$ is so attached that by means of its cutting edge $o$, directed downward and backward, the earth layer together with weeds, roots and clods, which has been detached by the tooth point $i$ and torn up by the tooth $a$, is forced between $a$ and $d$, cut up, and thus an easy, certain and regular breaking up of the ground is effected.

In the constructional form of Figs. 1 and 2 the blade $d$ is held by means of two bolts $e$ and $f$ firmly upon the tooth support $b$ and this blade is provided with a number of holes $g$ through which the bolt $e$ can be alternately inserted, as the depth of the tooth is to be greater or smaller, while in the construction shown in Figs. 3 and 4 the knife blade $d$ is provided with a slide $m$ supported between two guides fixed to the tooth holder $b$, which slide likewise possesses a number of holes $g$ through which it can be fastened alternately, corresponding to the desired depth of the tooth, by means of a bolt $e$ to the part $b$.

In Figs. 1 and 3, the bolt $e$ corresponding to the greatest depth of the tooth is placed in the lowermost hole $g$, while in Figs. 2 and 4 it is placed to correspond to the smallest depth of $a$ in the uppermost hole.

In the construction shown in Figs. 3 and 4 the slides $m$ may be secured on the supports $b$ in such a manner and be so connected together, that by means of a single mechanism at the same time they can be adjusted in the vertical direction with regard to the tooth points *i*.

What I claim is:

1. An agricultural implement with yielding polygonal teeth, the points of which lie parallel to the surface of the ground, characterized by the feature that each tooth is supported at its upper end by a supporting piece the shape of which is adapted to the form of the tooth and which serves for holding a knife blade adjustable in correspondence with the depth of the setting of the tooth, the said knife having its cutting edge directed downward and backward, for the purpose of pressing and cutting up the portion of earth detached by the point of the tooth parallel to the surface of the ground and directed by the tooth upward, between the tooth and the cutter, in like manner to the action of a shears.

2. An agricultural implement with yielding polygonal teeth, the points of which lie parallel to the surface of the ground, characterized by the feature that each of its teeth, curved to the extent of a quarter-circle, is supported at its upper end by a supporting piece the shape of which is adapted to the curve of the tooth and which serves for holding a knife blade adjustable in correspondence with the depth of the setting of the tooth, the said knife having its cutting edge directed downward and backward, for the purpose of pressing and cutting up the portion of earth detached by the point of the tooth parallel to the surface of the ground and directed by the tooth upward, between the tooth and the cutter, in like manner to the action of a shears.

In witness whereof I have hereunto signed my name this 12th day of May 1912, in the presence of two subscribing witnesses.

XAVER HELMBACHER.

Witnesses:
   GEO. GIFFORD,
   AMAND RITTER.

---

Copies of this patent may be obtained for five cents each, by addressing the "Commissioner of Patents, Washington, D. C."